United States Patent
Young et al.

(10) Patent No.: US 10,198,840 B2
(45) Date of Patent: Feb. 5, 2019

(54) SILHOUETTE DISPLAY FOR VISUAL ASSESSMENT OF CALCIFIED RIB-CARTILAGE JOINTS

(71) Applicant: KONINKLIJKE PHILIPS N.V., Eindhoven (NL)

(72) Inventors: Stewart Young, Hamburg (DE); Jens Von Berg, Hamburg (DE); Raoul Florent, Suresnes (FR); Claire Levrier, Suresnes (FR)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 16 days.

(21) Appl. No.: 15/321,084

(22) PCT Filed: Jun. 25, 2015

(86) PCT No.: PCT/EP2015/064327
§ 371 (c)(1),
(2) Date: Dec. 21, 2016

(87) PCT Pub. No.: WO2015/197738
PCT Pub. Date: Dec. 30, 2015

(65) Prior Publication Data
US 2017/0178378 A1  Jun. 22, 2017

(30) Foreign Application Priority Data
Jun. 27, 2014 (EP) .................... 14306025

(51) Int. Cl.
*G06T 11/60* (2006.01)
*G06T 11/00* (2006.01)
*G06T 7/174* (2017.01)
*G06T 7/11* (2017.01)

(52) U.S. Cl.
CPC ............. *G06T 11/60* (2013.01); *G06T 7/11* (2017.01); *G06T 7/174* (2017.01); *G06T 11/00* (2013.01); *G06T 2200/24* (2013.01); *G06T 2210/41* (2013.01)

(58) Field of Classification Search
CPC ........ G06T 11/60; G06T 7/11; G06T 2210/41
USPC .......................................... 382/132
See application file for complete search history.

(56) References Cited

U.S. PATENT DOCUMENTS

| | | |
|---|---|---|
| 5,049,746 A | 9/1991 | Ito |
| 7,397,886 B2 | 7/2008 | Avinash |
| 2005/0180541 A1 | 8/2005 | Avinash |
| 2008/0298656 A1 | 12/2008 | Yim |

(Continued)

FOREIGN PATENT DOCUMENTS

WO  2011077334 A1  6/2011

OTHER PUBLICATIONS

Turtleseg "Interactive 3D Image Segmentation Software", 2011.

(Continued)

*Primary Examiner* — Ryan R Yang
(74) *Attorney, Agent, or Firm* — Larry Liberchuk

(57) ABSTRACT

Apparatuses (IP) and related methods to visualize previously suppressed image structures in a radiograph (RD). A graphical indicator (505, 510, 515) is superimposed on the radiograph (RD) to indicate the suppressed image structure (412). The apparatuses allow toggling in our out the graphical indicator (505, 510, 515) or to toggle between different graphical renderings thereof.

12 Claims, 6 Drawing Sheets

(56) References Cited

U.S. PATENT DOCUMENTS

| | | | |
|---|---|---|---|
| 2012/0257810 A1 | 10/2012 | Von Berg | |
| 2013/0108135 A1* | 5/2013 | Huo | G06T 7/0083 |
| | | | 382/132 |
| 2015/0228071 A1* | 8/2015 | Jockel | A61B 6/08 |
| | | | 382/132 |

OTHER PUBLICATIONS

Hoggarth, M.A. et al "Dual Energy Imaging using a Clinical on-Board Imaging System", Physics in Medicine and Biology, vol. 58, 2013, pp. 4331-4340.

"Software that Increases Visibility, Decreases Time to Confirm Placement of Lifesaving Medical Devices Receives CE mark", Riverain Technologies, 2012.

Suzuki, Kenji et al "Image-Processing Technique for Suppressing RIbs in Chest Radiographs by Means of Massive Training Artificial Neural Network (MTANN)", IEEE Transactions on Medical Imaging, vol. 25, No. 4, Apr. 2006.

Vock, Peter et al "Dual Energy Substraction: Principles and Clinical Applications", European Journal of Radiology, vol. 72, 2009, pp. 231-237.

Werner, B. "Radiologically detectable modifications in the cartilaginous parts of the first pair of ribs in connection with age, sex and the cartilaginous part of the other ribs", Anat Anz. Sep. 1978;144(4):319-33—Abstract Only.

* cited by examiner

A　　　　　　　　　B

SILHOUETTE DISPLAY FOR VISUAL ASSESSMENT OF CALCIFIED RIB-CARTILAGE JOINTS

CROSS-REFERENCE TO PRIOR APPLICATIONS

This application is the U.S. National Phase application under 35 U.S.C. § 371 of International Application No. PCT/EP2015/064327, filed on Jun. 25, 2015, which claims the benefit of European Patent Application No. 14306025.9, filed on Jun. 27, 2014. These applications are hereby incorporated by reference herein.

FIELD OF THE INVENTION

The invention relates to methods for image processing, to image processing apparatuses, to computer program products and computer readable media.

BACKGROUND OF THE INVENTION

In certain fields of endeavor there is reliance on image information to gather intelligence. For instance, in the medical sciences diagnostic relies heavily on radiographic imagery. Radiographic imagery presents, broadly speaking, a projection view across a specimen (for instance a patient) that maps out the distribution of the amount of absorption suffered by an x-ray beam used to acquire the image. The interpretation of radiographic imagery may be challenging because certain structures of interest may lie either in front or behind highly absorbent anatomic structures such as bones. For instance, in chest radiography it is a frequently performed task to detect by means of radiographic imagery the presence of solitary pulmonary nodules (SPN). A number of techniques have been devised in the past to aid the physician with the task of interpreting such imagery. One such technique is dual energy subtraction techniques (DES) (see for instance Applicant's applicants WO/2011/077334). In DES adapted imagery (sometimes called "soft image") is produced where contributions of highly absorbent structures (such as bones) have been suppressed. This is because the presence of "footprints" in the original image of such highly absorbing structures may hamper image interpretation. However, it has been observed that even with such sophisticated techniques available errors in the interpretation of image information may still occur.

SUMMARY OF THE INVENTION

There may therefore be a need in the art for methods and related apparatus to better help extracting image information from radiographs.

The object of the present invention is solved by the subject matter of the independent claims where further embodiments are incorporated in the dependent claims. It should be noted that the following described aspect of the invention equally apply to the second aspect of the invention, to the image processing apparatuses, to the computer program elements and to the computer readable media.

According to a first aspect of the invention there is provided a method for image processing, including:

receiving a radiographic image that includes a region with suppressed image information;

on a display unit, effecting display of an augmented image that includes the radiographic image along with a graphical indicator superimposed or at least superimposable on said radiographic image, wherein said graphical indicator comprises only an outline of at least a part of said suppressed region.

According to one embodiment, the method comprises:

in response to a request, i) toggling said graphical indicator out or (back) into the radiographic image or ii) toggling between different graphical renderings of said graphical indicator, the outline of said suppressed region being one of said graphical renderings.

According to one embodiment, the different graphical renderings include: a) said outline in combination with the suppressed image information, b) the suppressed image information at the exclusion of said outline. In other words, in one embodiment the graphical indicator is formed from (previously suppressed) actual image intensities relating to specific anatomical structures of interest.

In other words the proposed method proposes to visually mark-up the location and/or spatial extent (in the image plane) of a footprint of a high (or in some embodiments low) density structure in the radiograph where this image information has been suppressed so would not ordinarily be visible in the radiograph. The suppression operation on occasion causes otherwise connected image structures to disassociate. The proposed visual mark-up will then "point" or visually guide the user to another part of said structure of lesser density that does show in the soft image. In this way the user may better visually associate (or "re-connect") structures of different densities that would otherwise appear as clutter around the image that may cause misinterpretations.

In one embodiment of the invention, the graphical indictors may be interactively toggled into/out of the image, such that the entire image signal for a particular structure (such as a rib bone in CXR) may be visually evaluated interactively.

According to one embodiment, the image is of an object having at least two parts of different densities, wherein the suppressed image information corresponds to attenuation contribution of the part with the higher density or corresponds to the attenuation contribution of the part with the lower density.

According to one embodiment, the object of higher density is a bone.

According to one embodiment, the suppression of the image information is based on a previous segmentation and subtraction from a complete radiograph or is based on dual energy subtraction.

According to one embodiment, the radiographic image is a chest radiograph.

According to a second aspect of the invention there is provided a further method for image processing, including the steps of:

receiving a radiographic image that includes a region with suppressed image information;

on a display unit, effecting display of an augmented image that includes the radiographic image along with a graphical indicator superimposed on said radiographic image, wherein said graphical indicator indicates at least a part of said suppressed region; in response to a request, i) toggling said graphical indicator out or back into the radiographic image or ii) toggling between different graphical renderings of said graphical indicator.

According to one embodiment, the different graphical renderings include: a) only an outline of at least a part of said suppressed region b) said outline in combination with the suppressed image information, c) the suppressed image information at the exclusion of said outline.

According to a third aspect of the invention there is provided an image processing apparatus configured to perform the method according to the first aspect.

According to one embodiment, the image processing apparatus is furthermore arranged to, in response to a request, i) toggle the graphical indicator out or back into the radiographic image or ii) to a toggle between different graphical renderings of said graphical indicator, the outline of said suppressed region being one of said graphical renderings.

According to one embodiment, the different graphical renderings of the graphical indicator include: a) the outline in combination with the suppressed image information, or b) the suppressed image information at the exclusion of said outline.

According to a fourth aspect of the invention there is provided an image processing apparatus configured to perform the method according to the second aspect.

According to one embodiment, the image processing apparatus is furthermore arranged for including as the different renderings of the graphical indicator: a) only an outline of at least a part of said suppressed region, or b) said outline in combination with the suppressed image information, or c) the suppressed image information at the exclusion of said outline.

BRIEF DESCRIPTION OF THE DRAWINGS

Exemplary embodiments of the invention will now be described with reference to the following drawings wherein.

DETAILED DESCRIPTION OF EMBODIMENTS

Figure 1:
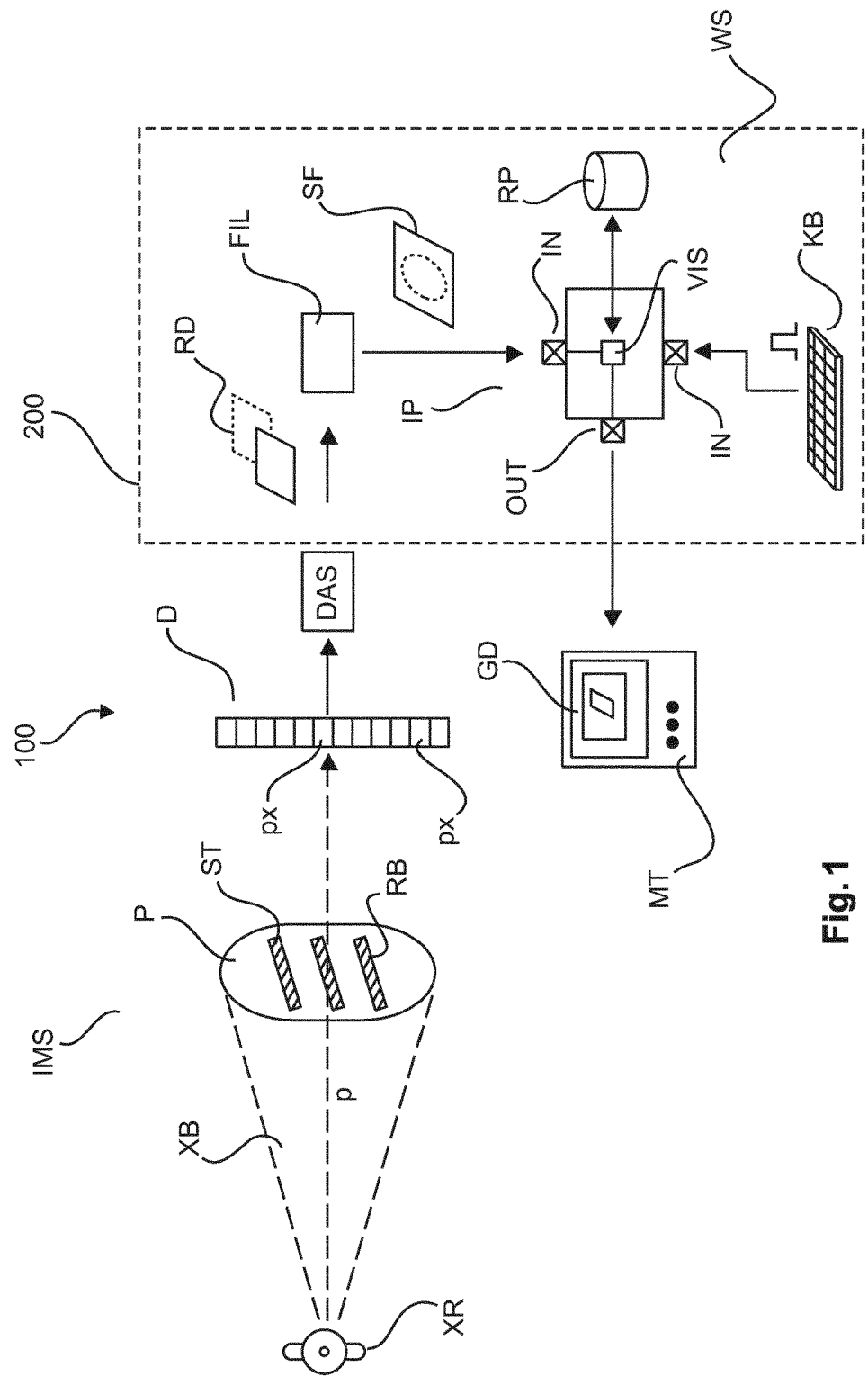
FIG. 1 shows an imaging arrangement.

With reference to FIG. 1 there is shown an arrangement 100 including an acquisition component IMS for acquisition of radiographs RD (X-ray images) of an object P and a system 200 to support visual analysis of the radiographs so acquired.

The image acquisition component IMS includes an X-ray source XR and a radiation sensitive detector D. The x-ray source XR and the detector D are suitably supported in a mechanical structure such as a gantry (not shown). The image acquisition component IMS may include but is not limited to an x-ray imager of the C-arm type or may include a CT image apparatus or any other apparatus suitable for the acquisition of x-ray based radiographs.

The x-ray source XR is configured to emit, during an imaging session, x-ray radiation. More particularly, X-ray beam XB passes through an examination region and then impinges on a radiation sensitive surface of the detector D. The radiation sensitive surface is made up from one or more rows of detector pixels px. Within the examination region traversed by x-ray beam XB is an examination table T. On the examination table T, a sample/object P to be imaged (for instance, a human or animal patient) is deposited. In another embodiment, there is no examination table but the patient P is asked to stand in the examination region during the X-ray.

When correctly positioned, the x-ray beam passes through patient P at a region of interest ROI, the human chest for instance in chest x-ray examinations (CXR). During its passage through the sample P, the x-ray beam is modified for instance by absorption interaction with matter in the sample P. The degree of absorption is a direct measure of the absorption co-efficient distribution or of the density distribution in the patient. Individual rays of the x-ray beam are therefore differently modified or absorbed depending on where the respective rays pass through the sample P. The so modified x-ray beam that emerges at the other end of the patient and then interacts there with detector D. Depending on the intensity detected at the detector, corresponding electrical signals are issued which are then passed to a DAS (data acquisition system not shown). The DAS includes suitable A/D conversion circuitry to convert said electrical signals into digital form, also referred to as detector raw data, essentially an array of numbers where each entry corresponds to the image information as recorded or "seen" by a respective one of the image pixels px. This array of numbers forms an X-ray image. The X-ray image is a projection view on the imaged sample acquired at a certain projection direction relative to the region of interest ROI. The projection direction (which may be taken as the direction of a central beam of the x-ray beam relative to the region of interest) may be adjustable so that one or more projection images along different projection directions can be acquired of the ROI.

The X-ray beam XB emitted by source XR can be thought of as being made up from different rays. More particularly then and as diagrammatically shown in FIG. 1 at the example of ray p incident on detector pixel px, the image information recorded by pixel px corresponds to the cumulated absorption suffered by ray p in its passage through patient P.

The amount of absorption suffered will depend on the type of matter which the ray p encounters in its passage through the patient. For instance, matter of higher density such as bone will cause more absorption than the surrounding soft tissue. As shown in FIG. 1 the particular ray p passes through soft tissue (shown as white background) and bone tissue RB such as a patient's rib bone RB. The scenario shown in FIG. 1 corresponds to a chest x-ray radiograph CXR taken of patient P. The overall absorption recorded at any one pixel can be thought of as a linear combination of bone and soft tissue contributions. Although useful in some context such as CXR, this "dualistic" soft tissue-bone model to explain absorption is a simplified one and can be readily extended to include contributions from other matters of different densities. For instance the contribution of soft tissue can be further resolved into tissues of different densities with their respective contributions, etc.

A work station WS is communicatively coupled with the DAS. The X-ray image is transmitted to work station WS via a wired or wireless connection. There, the X-ray image may then be stored away for later reference or may be rendered for view by suitable visualization software and displayed on a monitor MT.

In the following operation of the imaging arrangement in FIG. 1 will be explained at the example of chest radiograph CXR with the understanding that the arrangement can so be used with benefit in other medical or non-medical imaging contexts. Chest radiography (CXR) is one of the most commonly performed clinical examinations, and plays an important role in detecting and diagnosing lung cancer. Possible locations of definitions of cancerous tissue are formed by pockets of lesions called solitary pulmonary nodules (SPNs). Detection of SPN in CXR images is a challenging clinical task, which is complicated by overlying bone structures, such as the patient's rib cage, clavicle bones and shoulder blades.

Figure 5:
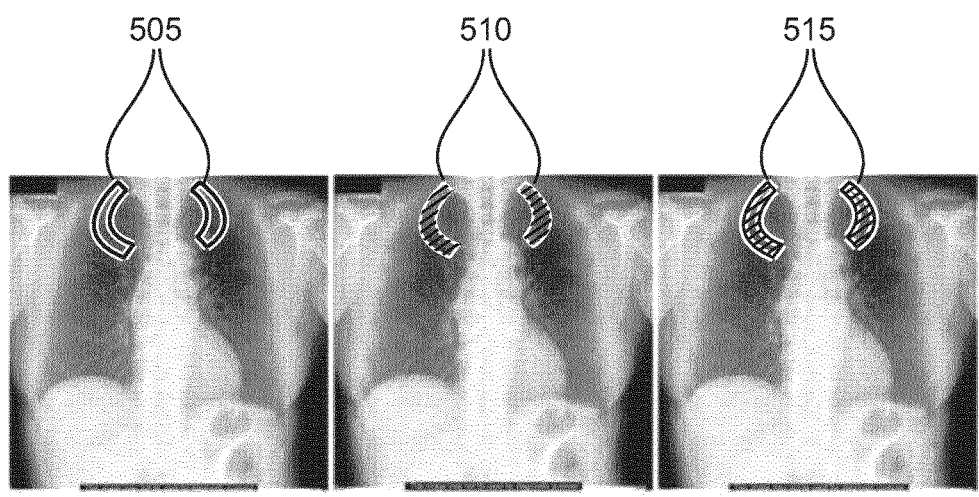
FIG. 5 shows a different embodiment of graphical indicators superimposed on an image of an anatomy of interest.

Very broadly, the DAS outputs the above mentioned one or more arrays of numbers as one or more radiographs RD. The radiographs RD are then processed by a filter arrangement FIL (possibly resident on works station WS) to produce, in one embodiment, a soft image SF. In the soft image the contributions of bone have been suppressed or filtered out so as to maintain only the contribution from the surrounding soft tissue. The soft tissue image is then forwarded via an input port IN to a visualization arrangement or apparatus IP which will be explained in more detail below. The visualization apparatus processes the soft tissue image SF to output at output port OUT a graphics display GD or "augmentable image" which can then be rendered for view on monitor MT. Different embodiments of the graphics display are shown in FIG. 5 and their purpose will be likewise explained in more detail below. Broadly, the graphics display is combined from certain graphical indicators 505-515 (as per FIG. 5) and the original soft tissue image SF. The graphics display GD affords a better interpretation of the image information.

The filter arrangement FIL may be implemented as a dual-energy subtraction (DES) imaging algorithm or as a bone subtraction imaging (BSI) algorithm. For DES, see for instance Vock P, Szucs-Farkas Z (2009) "Dual energy subtraction: principles and clinical applications", Eur J Radiol. 2009 November; 72(2):231-237 which is incorporated herein by reference in its entirety. For BSI see for instance Suzuki K, Abe H, MacMahon H, Doi K (2006) "Image-processing technique for suppressing ribs in chest radiographs by means of massive training artificial neural network (MTANN)" IEEE Trans Med Imaging 2006 April; 25(4):406-416 or in applicants WO/2011/077334, both incorporated herein by reference in their entirety.

In DES, a weighted subtraction of two posterior-anterior (PA) projection radiographs collected using different X-ray energies (typically 120 and 60 kV) is used to estimate the contribution of the bones in the image. The resulting "bones image" may then be subtracted from the original image (the image acquired at the higher voltage is usually taken as the original image) in order to generate the soft (tissue) image SF. The soft image SF may in some instances be easier to interpret for identifying SPNs since the bone "footprints" have been removed or suppressed. However, DES imaging requires the availability of suitable acquisition hardware, and furthermore image interpretation can also be compromised by motion induced artefacts (e.g. cardiac, muscular and/or respiratory motion) between the two required images.

In BSI, pattern recognition algorithms are applied to estimate the "bones image" using a single PA projection radiograph, which is then subtracted to obtain the soft image SF analogously to DES imaging. The algorithmic approach of BSI comprises in general two steps: (i) recognition of the location of the relevant structures (e.g. by segmentation), and (ii) suppression of these structures from the image.

Figure 3:
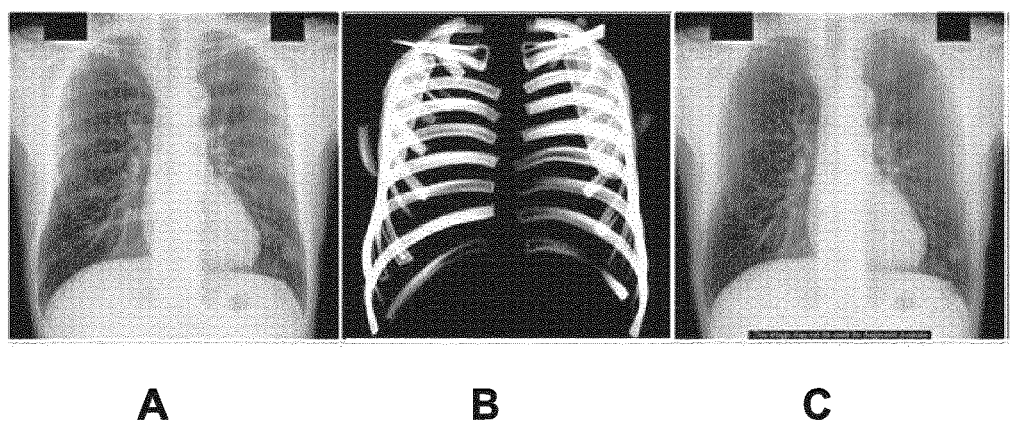
FIG. 3 shows three images of an anatomy of interest.

FIG. 3 illustrates some exemplary imagery. An example of a CXR image that includes a solitary pulmonary nodule (at the lower-left side of the lungs in the image) footprint is shown in see left pane A. The associated "bones" image as estimated by a BSI algorithm is shown in middle pane B. The resulting soft image SF for subsequent visual evaluation or processing is shown in right pane C.

Both, DES or BSI are envisaged herein although BSI is the preferred embodiment as the dual energy hardware, on which DES relies on, is not required.

After suppression by either BIS or DES or in fact by any other suitable filter arrangement, the soft image SF may then be visually evaluated by an expert in image interpretation, for instance for the purpose of SPN detection. However it has been found by Applicant that reliance only on said soft images may on occasion lead to incorrect findings. This is because any bone structures which are not suppressed, or only partially suppressed, in the soft image can potentially induce errors in this interpretation. In theory, two types of errors can occur: (i) false positive error, for example a section of a bone not suppressed by BSI is misinterpreted as a SPN or (ii) false negative error, for example a section of a bone not suppressed by BSI is superimposed upon a SPN, leading to a failure to detect the lesion.

Figure 2:
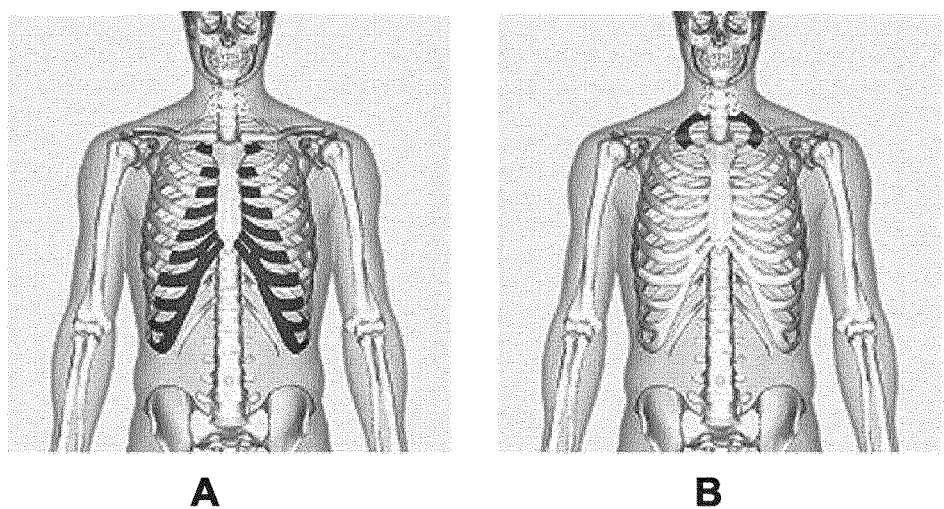
FIG. 2 shows an anatomy of interest.

An important reason for potential false positive findings is calcification of the costal cartilage, especially in the connection of the first rib to the sternum. When calcification occurs, this structure becomes increasingly radio-opaque (depending upon the degree of calcification), and so can sometimes induce a shadow in the posterior-anterior (PA) image. FIG. 2 illustrates the anatomical situation. The costal cartilage (shown hachured in left pane A) connects the anterior end of the individual rib bones to the sternum or breastbone located anteriorly at the center of the thorax. In elderly patients, the costal cartilage may become calcified, making it detectable in CXR images. This effect is particularly prominent in the cartilage parts connecting the first ribs (shown hachured in right pane B) to the sternum.

Figure 4:
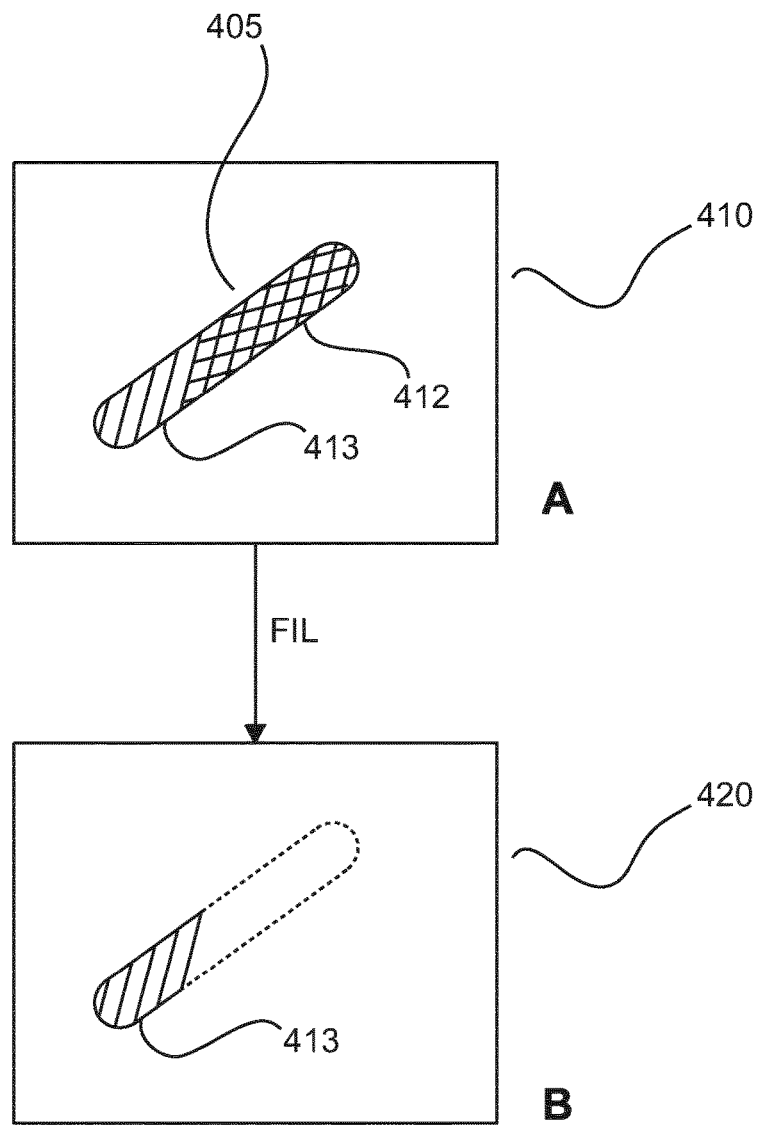
FIG. 4 shows two images of an anatomy of interest with image information partially removed or suppressed.

FIG. 4 illustrates the undesirable effects of the bone suppression or removal. The radiograph 410 prior to processing by the filter arrangement FIL includes all the image information including the bone "footprint" 405 (for instance the footprint of a rib RB in CXR). The term "footprint" as used herein is a convenient shorthand for the image portion that represents the projection view of the relevant structure. The bone footprint 405 is made up of a bony part 412 (only one rib is shown) and the calcified appendage 413 thereof. Both parts have a higher radio-opacity than the surrounding soft tissue (shown in white background) with the bony part of the rib 412 having a higher density than the calcified cartilage 413, shown in the Figure as different degrees of hatchings. Now, if the filter is applied to radiograph 410, the soft tissue image 420 is produced. Because the calcified cartilage appendage 413 has a lower density (and hence radio-opacity) than the bony part 412, this will result in the calcified part 413 not being suppressed in the soft image 420. In other words the calcified part 413 may appear as "disconnected" from the now removed boney part 412 (shown in dashed lines). In other words there is a danger that the footprint of the calcified cartilage 413 may be interpreted incorrectly as a nodule because its "reference structure" (the rib bone that is) is now missing. Because of this disconnect, the remaining, now isolated footprint of the calcified part 413 can induce a "shadow" in soft image 420 with an appearance similar to that of an SPN which usually features as a radio-opaque, blob-like shape, with diameter of about 5-30 mm.

To address this disadvantage as presented in the filtered imagery 420 (such as for instance in the soft image SF), an image processor IP with a visualizer VIS component is proposed herein that operates to display, in one embodiment, the soft image SF with one or more graphical indicators 505, 510, 515 superimposed on the soft image. The graphical indicators thereby indicate graphically for instance the outlines 505 of the anatomical structure (for instance, the bone RB footprints) that has been removed during the filter stage for instance by a BSI operation or a DES operation. The visualizer operates to display "augmented" or "augmentable" soft images GD, in which for instance the outlines of suppressed or removed anatomical structures (bones) are superimposed or are at least superimposable upon the original soft image SF. Displaying the outline of the suppressed structures 412 can help the image interpreter better differentiate between potential lesions (such as SPNs) and harmless structures by indicating the precise locations of the anatomical reference structures 412 which are as such no longer visible in the soft image SF. Furthermore, in embodiment, the visualizer includes an event handler that enables user interaction in respect of the manner of (re-)display of the suppressed structures. For instance, the outlines or contours of the removed structure 412 can be interactively or automatically added to or removed from the underlying soft image SF.

FIG. 5 shows different embodiments or renderings 505, 510 and 515 of the graphical indicator. For instance the graphical indicator may be formed by displaying in the soft image SF in a highlighted fashion only the outlines 505 (also referred to herein as "contour(s)" or silhouette(s)) of the removed structure such as the bone footprint 405. Alternatively, the outlines 505 are not displaced but only the original image information or intensities that have been removed 510 are displayed. In a different embodiment the graphical indicator 515 is a combination of 505 or 510. In other words the highlighted outline 505 is displayed alongside the inside (that is, the suppressed intensities) of the bone structure footprint 510. In yet other words, the graphical indicator may either be rendered as a highlighted contour only, or the previously suppressed bone intensities are now superimposed (so are no longer suppressed) but without the highlighted contour, or the previously suppressed bone intensities are displayed as superimposed on the soft image but with the highlighted contour surrounding same. Briefly, the graphical indicator superimposed on the soft image 420 is either "contour only" (with no inside), or is inside only without contour or is inside with contour.

Figure 6:
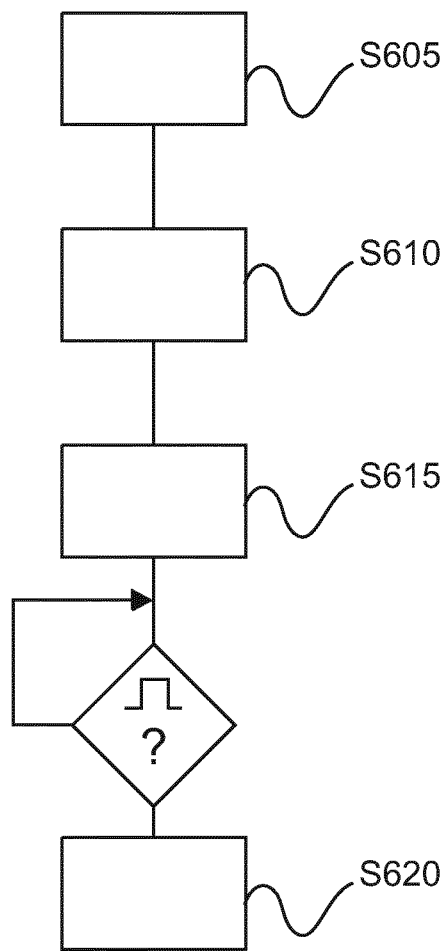
FIG. 6 is a flow chart of an image processing method.

Reference is now made to the flow chart in FIG. 6 which illustrates various steps of the image processing method as implemented by the image processor IP described above.

At step S605 a radiograph image RD is received and processed by the filter unit FIL to produce, in one embodiment, soft image SF. In the soft image SF, contributions of a structure RB having a pre-defined absorption co-efficient or having an absorption co-efficient in a pre-defined interval (measured for instance in Hounsfield units) is removed or suppressed from the original radiograph RD.

The suppressed image may be one of a structure that has a higher density than other structures (for instance surrounding structures) whose respective radiographic footprints likewise feature in the original radiograph. The filtering to obtain the soft image SF can be achieved by employing suitable algorithms such as DES or BIS. However, any other suitable algorithm to filter image information can also be used with benefit herein. "Filtering" as used herein includes in particular a decomposition of the original radiograph into the respective contributions (to the overall absorption) of various structures of different densities that have been imaged. Whichever filtering algorithm is used herein, in one embodiment it is envisaged that the suppressed removed image information is defined by a set of descriptors, for instance in image co-ordinates that precisely outline and precisely define which part of the image has been modified. Furthermore, the removed image intensities (that correspond to the contribution of the removed footprint structure) themselves are retained, for instance stored, in association with their respective coordinates, in a suitable data structure for later retrieval. In other words, what is required in a preferred embodiment is an explicit description of those image objects which have been removed from the original image. For instance, a BSI algorithm may be used to estimate the location in the image of a set of anatomical structures. In this approach, each of the considered structures (bones) is explicitly represented by a set of "descriptors", which might for example include center-of-gravity, angulation, contour point locations, center-line point locations, radius values associated with particular points, etc. This approach is in contrast to an implicit representation of the suppressed bone image information, for example in the approach presented in the Suzuki reference cited earlier, where the bones image is obtained as response to operation of an artificial neural network (ANN).

Although a filter algorithm that furnishes an explicit description of the removed image object is preferred herein, use of such an implicit algorithm to achieve the filtering (such as via the ANN) is likewise envisaged herein in some embodiments. If an implicit algorithm is used, an additional post processing step may be applied to provide the necessary co-ordinate wise definition of the suppressed image structure or object. In one embodiment, as has been explained previously, the suppressed structure may be the footprint of a bone and the radiograph is a chest x-ray. However, it is understood that this is purely exemplary and other anatomical structures or other imaging techniques are likewise envisaged herein.

At step S610 the soft image is then received alongside with suitable reference information that allows retrieving the previously computed descriptors of the suppressed image structure. The descriptors may either be stored separately in a repository RP or may be embedded as meta-information in the header of the image file, for instance in a suitably defined DICOM field. However, other implementations are likewise envisaged so long as they allow retrieval of the descriptors associated with the soft image and the suppressed one or more objects.

At step S615 a visualization component VIS operates to display the soft image SF on a screen MT and to superimpose on the soft image SF at the correct position a graphical indicator 505-515 indicative of the removed or suppressed image structure. The correct position can be determined by accessing the set of descriptors that are stored in association with the soft image SF.

The graphical indicators may be either one or a combination of the ones shown in FIG. 5. For instance, the graphical indicator may include the highlighted outline of the removed image structure 505. In a different embodiment it is the removed image intensities themselves that are outlined without any additional outlining of the periphery. Or, as shown in the right pane of FIG. 5, a combination of the two is effected in that it is the outline along with the removed image information that is displayed. The graphical indicator 505, 510 or 515 when displayed superimposed on the soft image is suitable to "point" or guide the observer to a hitherto isolated footprint of the calcified cartilage part 413 that has remained in the soft image. In this way the observer can readily associate a possibly suspicious image structure with the now displayed bone or graphical indicator thereof and a possibly false diagnosis can be avoided. The proximity of the superimposed bone indicator 505-515 or the manner in which the bone indicator 505-515 visually fits, or transitions into the structure 413 in the soft image SF will readily allow the user to visually establish whether structure 413 is merely part of the bone or may indeed be a lesion or anatomy or interest. In one embodiment it is envisaged to show all the outline along the whole length of the removed bone part so as to make adjacency of the removed bone part and the calcified cartilage part 430 more readily visible. In one embodiment it is envisaged to selectively, that is upon user request or upon an automatic request, toggle in or out of the graphical indicator into the displayed soft image. In one embodiment toggling in or out of any one of the graphical indicators 505, 510 or 515 is implemented upon user request. In this embodiment an event handler is implemented that iterates to listen for a user issued event such as a keyboard event KB or a mouse click event or a touch screen event, etc. If such a user event is intercepted, the method operates at step S620 to either toggle-in the requested graphical indicator or to toggle-out the graphical indicator if currently displayed.

A sequence of such toggling in or out events may be issued at a desired request rate. For instance, by issuing mouse click events at a desired rate, the graphical indicator will appear as "flickering" on the screen at said rate. This is advantageous because it allows the observer to efficiently make use of the available image information. For instance, on the one hand the toggling in of the graphical indicator is desired to ascertain whether a possibly suspicious image structure is indeed part of the suppressed structure but on the other hand toggling the structure back out (that is re-effecting the suppression) frees up the view on image information behind or in front (in projection view) of the bone structure. The interactive functionality of toggling-in or -out the previously relevant image structure allows striking a useful balance between the different visualizations by being able to quickly switch between same, depending on the interpretation task at hand.

In addition of being able to toggle in and out a given one of the different graphical indicator representations as shown in FIG. 5, the visualization may also operate to cycle through each of the different graphical indicators in response to the received mouse clicks.

For instance, after the first mouse click is received the representation 505 according to the left pane of FIG. 5 is displayed. A further mouse click will then effect instead the graphical representation 510 and the third mouse click will then effect the representation 515 as per the right pane of FIG. 5 whereas a fourth mouse-click again effects display of indicator 505. Any sequence of consecutive representations is envisaged herein, the sequence just described being just an example. In one embodiment the various graphical indicators for the different bones, ribs, are shown in different colors or in different line renderings or are shown as outlined in different heaviness. For instance, in one embodiment the left and right rib bones have their outlined rendered in different colors such as green and red.

In one embodiment it is envisaged that the graphical indicators for any one (or at least a plurality) of a desired rib bone can be toggled in or out as described. According to this embodiment each of the rib bone structures is individually addressable each having their respective descriptors that allows definition of the bone in the soft image. To be able to display the graphical indicators for each design of the bones or rib bones it is envisaged that at the processing step S605 there is a segmentation step that allows breaking up the overall "rib bone tree" (as recorded in the original radiograph) into the respective footprint components of the rib bones 405. In one embodiment the graphical indicators are based on segmenting each or at least a plurality of the rib footprints individually/separately so they are each "addressable" and can be toggled in and out independently from each other.

Again, the rib bone scenario is merely exemplary for illustrative purposes.

If, at the filter stage, a non-segmentation based algorithm is used such as DES, there may then be a post processing or additional segmentation step by means of which this breaking up into individual bone structures can be achieved.

As mentioned above, the toggling in or out of the graphical indicators or the cycling through the different types of graphical rendering of the visual indicator is in response for instance of a mouse click or keyboard event. For instance, in one embodiment, there is a graphical user interface shown alongside the soft image that allows the user to specify for instance by tick boxes or otherwise the desired graphical rendering. There is also a toggle button arranged as a GUI widget. When clicking repeatedly on this button a respective toggle in or out of the desired bone structure is effected. Usually, for the critical task of SPN it is only the first rib pair that is of interest. However, in other embodiments more than one rib pair can be visualized in the soft image. In this scenario the user is asked to specify which one of the bone structures he wished to toggle in or out or for which rib bone the user wishes to change the graphical rendering. According to one embodiment this is achieved by displaying alongside to the augmentable soft image GD, a bone image or the original radiograph. In the original radiograph or in the bone image (for instance see FIG. 3B) the user can then click on the desired rib. An event handler intercepts this signal and uses the clicked on information to identify, using the various sets of descriptors, the respective rib bone footprint which comprises the clicked on image position. The graphical indicator for the desired bone is then displayed in the soft image in the desired graphical rendering, and further clicks in the soft image or in the bone image will then result in repeatedly toggling in or out of the graphical indicator or changing the graphical rendering of the graphical indicator as per FIG. 5. However, the selection of the desired bone structure and the toggling in or out or changing the graphical indicator thereof can also be achieved in any other ways. For instance by showing a menu selection in list form or a schematic pictogram of the human rib cage where the user can identify by click operation the desired rib to be visualized. In short, and as will be appreciated from the previous description, the proposed apparatus allows the user to visually and interactively examine image information. The various image intensities encoded in the original radiograph can be removed or reinserted at will to build up, from the soft image (that includes only a certain amount of radiographic information) the augmented image to gradually build up the original radiograph.

In one embodiment the toggling in or out or the toggling between the different graphical indicators 505-515 is not responsive to a user request but the request as issued automatically by the image processor IP at a user adjustable or fixed rate.

It should be appreciated that using as an initial image the soft image is one example only. For instance, instead of starting with the soft image one may also, in one embodiment, start with a "hard image" such as the bone image FIG. 3B that includes only the bone contributions, for instance, and can then request toggling in or out or can toggle between different graphical renderings of different portions of the surrounding soft tissue.

Also the above dualistic approach can be extended to include many layers of different image intensities. For instance, in the above the original radiograph has been decomposing merely into one collective soft image contribution and a bone contribution. This can be extended for instance to decompose an angiographic image into not only soft tissue and bone tissue images but also into an image that represents the contribution of the contrast agent that resided in the image object when the radiograph has been acquired. In this multi-layer embodiment, the filter stage at step S605 will operate to produce not only a soft or bone or "hard" image but will produce a hierarchy of different images or (after a possible segmentation thereof) different image objects that can each be selectively toggled in or out as desired. Each of the suppressable or removable image objects then corresponds to a structure of a different level of radio-opacity. This allows interactively blending in or building up the actual image from absorption contribution for each of differently absorbing anatomical structures. In one embodiment, the filter stage FIL includes a spectral imaging backend that resolves the original image signal into different absorption contributions to so produce, for instance, the soft tissue images, the bone image and the "contrast agent only" image for instance. Alternatively, a plurality of different soft images can be generated, each corresponding to different soft tissues that cause different amounts of absorption. In one embodiment, a segmenter then breaks up each of the images into image object components than can then be individually processed by image processor IP as described above. The proposed apparatuses and methods can be used with benefit as part of a medical image viewing workstation or of an x-ray camera acquisition console, or in any other equipment configured to perform or support post-processing/image analysis of x-ray radiographs.

In another exemplary embodiment of the present invention, a computer program or a computer program element is provided that is characterized by being adapted to execute the method steps of the method according to one of the preceding embodiments, on an appropriate system.

The computer program element might therefore be stored on a computer unit, which might also be part of an embodiment of the present invention. This computing unit may be adapted to perform or induce a performing of the steps of the method described above. Moreover, it may be adapted to operate the components of the above-described apparatus. The computing unit can be adapted to operate automatically and/or to execute the orders of a user. A computer program may be loaded into a working memory of a data processor. The data processor may thus be equipped to carry out the method of the invention.

This exemplary embodiment of the invention covers both, a computer program that right from the beginning uses the invention and a computer program that by means of an up-date turns an existing program into a program that uses the invention.

Further on, the computer program element might be able to provide all necessary steps to fulfill the procedure of an exemplary embodiment of the method as described above.

According to a further exemplary embodiment of the present invention, a computer readable medium, such as a CD-ROM, is presented wherein the computer readable medium has a computer program element stored on it which computer program element is described by the preceding section.

A computer program may be stored and/or distributed on a suitable medium, such as an optical storage medium or a solid-state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A method for image processing, comprising:
receiving a radiographic image that includes a region containing a suppressed image information; and
displaying an augmented image that includes the radiographic image and a graphical indicator that is superimposed on the radiographic image, wherein the graphical indicator comprises only an outline of the region containing the suppressed image information.

2. The method of claim 1, comprising:
in response to a request, i) toggling the graphical indicator out or back into the radiographic image, or ii) toggling among graphical renderings of the graphical indicator, the outline of the region containing the suppressed image information being one of the graphical renderings.

3. The method of claim 2, wherein the graphical renderings of the graphical indicator include the outline in combination with the suppressed image information.

4. The method of claim 1, wherein the radiographic image is of an object having at least two parts of different densities, wherein the suppressed image information corresponds to attenuation contribution of the part with the higher density or corresponds to the attenuation contribution of the part with the lower density.

5. The method of claim 4, wherein the object of higher density is a bone.

6. The method of claim 5, wherein the suppressed image information is based on a previous segmentation and subtraction from a complete radiograph or is based on dual energy subtraction.

7. The method of claim 1, wherein the radiographic image is a chest radiograph.

8. An image processing apparatus, comprising:
   a processor configured for receiving a radiographic image that includes a region containing a suppressed image information; and
   a display for displaying an augmented image that includes the radiographic image and a graphical indicator that is superimposed on the radiographic image, wherein the graphical indicator comprises only an outline of the region containing the suppressed image information.

9. The image processing apparatus according to claim 8, furthermore configured to:
   in response to a request, i) toggling the graphical indicator out or back into the radiographic image, or ii) toggling among graphical renderings of the graphical indicator, the outline of the region containing the suppressed image information being one of the graphical renderings.

10. The image processing apparatus according to claim 9, wherein the graphical renderings of the graphical indicator include: the outline in combination with the suppressed image information, or the suppressed image information at excluding the outline.

11. The image processing apparatus according to claim 8, wherein the graphical renderings of the graphical indicator include: only the outline of at least a part of the suppressed image information, the outline in combination with the suppressed image information, or the suppressed image information at excluding the outline.

12. A non-transitory computer-readable medium having one or more executable instructions stored thereon, which when executed by a processor, cause the processor to perform a method for image processing, the method comprising:
   receiving a radiographic image that includes a region containing a suppressed image information;
   displaying an augmented image that includes the radiographic image and a graphical indicator that is superimposed on the radiographic image, wherein the graphical indicator comprises only an outline of the region containing the suppressed image information.

* * * * *